United States Patent [19]

Freige et al.

[11] Patent Number: 4,538,073
[45] Date of Patent: Aug. 27, 1985

[54] MODULAR POWER SUPPLY SYSTEM

[75] Inventors: Diab E. Freige, Los Altos; John J. Lockwood, San Jose; Michael Ramsay, Los Altos; Leroy B. Keely, Sunnyvale, all of Calif.

[73] Assignee: Convergent Technologies, Inc., Santa Clara, Calif.

[21] Appl. No.: 493,103

[22] Filed: May 9, 1983

[51] Int. Cl.³ .............................................. H02J 3/00
[52] U.S. Cl. ..................................... 307/33; 307/75; 307/82; 363/17; 363/37; 363/71; 364/200
[58] Field of Search .................. 307/150, 151, 33, 34, 307/82, 75, 84; 323/266, 267, 272, 280, 281, 285, 354; 363/17, 37, 71, 65

[56] References Cited

U.S. PATENT DOCUMENTS

| | | | |
|---|---|---|---|
| 2,808,521 | 10/1957 | Scal | 307/150 |
| 2,836,789 | 5/1958 | Maly | 323/354 |
| 3,461,310 | 8/1969 | Pintell | 307/151 |
| 3,641,419 | 2/1972 | Koltuniak et al. | 363/70 |
| 4,085,334 | 4/1978 | Shinohara et al. | 307/151 |
| 4,162,536 | 7/1979 | Morley | 364/200 |
| 4,194,147 | 3/1980 | Payne et al. | 323/285 |
| 4,222,003 | 9/1980 | Kline | 323/281 |

OTHER PUBLICATIONS

Ruddy, "Constant-Voltage Switching Regulator," IBM Technical Disclosure Bulletin, vol. 14, No. 9, pp. 2784, 2785, Feb. 1972.
Russ, "Fuente de Alimentación de Laboratorio de 400 W," Revista Telegrafica Electronica, vol. 64, No. 757, pp. 20-24, Jan. 1976, (Argentina).
Yamamura et al, "DC-DC Electronic Power Converter for Electronic Switching Systems," Jap. Telec. Review, vol. 17, No. 3, pp. 227-234, Jul. 1975.
Malia, "Regulated Power Supply," IBM Tech. Discl. Bul., vol. 12, No. 5, pp. 723-726, Oct. 1969.

Primary Examiner—William H. Beha, Jr.
Attorney, Agent, or Firm—Townsend & Townsend

[57] ABSTRACT

A power distribution system intended for use in a highly modular desk top computer system is disclosed. The invention provides a programmable modular DC power supply including a power module that produces a first fixed regulated DC voltage which is coupled from the power module to a power bus. Thereafter the first voltage is distributed to a plurality of DC-to-DC convertors, each of which is operable to change the first DC voltage to a second regulated DC voltage selected from a plurality of programmed voltage values.

16 Claims, 4 Drawing Figures

MODULAR POWER SUPPLY SYSTEM

BACKGROUND OF THE INVENTION

1. Field of the Invention

The present invention relates to direct current (DC) power supplies. More particularly, the present invention relates to a modular DC power supply providing a plurality of selectable programmed voltage output levels. The power supply provides unlimited expansion capability for data processing or other modular electronic systems by allowing ready addition to the system of generic power supply modules that correspond to and provide power to added functional system modules.

2. Description of the Prior Art

There is an immense variety of line-powered DC power supplies and power supply circuits commonly available to electronic equipment designers and manufacturers. The manifold applications of electronic technology have spawned a vast body of knowledge relating to the production of a DC voltage from an AC line source. As new electronic devices are produced to meet the relentless onward rush of electronic technology, new problems of powering the devices are created.

The concept of modularity in electronic devices is gaining increasing popularity. A modular electronic system, such as a modular data processing system, grows from a basic configuration accommodating few users (or having basic features) to a very large configuration accommodating many users (or having augmented features). Providing a complete power supply for each module in the system is redundant to the extent that each power supply must duplicate several common circuit components. Such an approach to powering modular electronic systems wastes valuable user work space, generates excessive heat and increases the likelihood of power supply produced electrical interference within the system and other sensitive devices. Interconnecting or cabling the various modules as the system grows becomes a topological nightmare. Unfortunately, there has been no implementation in the power supply art solving the above-noted limitations wrought by the evolving field of modular electronic systems.

SUMMARY OF THE INVENTION

The present invention is a power distribution system intended for use in a highly modular desk top computer system. The primary goal of the present invention is to convert AC line voltage at 110 or 220 volts into safe, low voltage DC, which is then distributed between functional modules in an electronic system to provide power to each module. A further goal of the present invention is to provide power in such a way as to reduce the physical size of the system and the amount of heat produced by the system. Accordingly, a system user's work space is unencumbered with bulky, heat producing equipment. The intrusion of such equipment is further minimized by having all user-accessible portions of the equipment operate at low voltage levels so that the user is protected against hazardous voltages (the only exception to this being in certain of the circuits in the monitor). Inherent in the modular power distribution is the distribution of power generation between generic power modules such that no one power module costs more than is necessary to supply its corresponding system module power requirements.

There are four major elements to the present power distribution system—a power module, a DC interconnect cable, a modular DC interconnect, and a DC convertor. The power module consists of a floor standing unit about the size of a brick, which connects into the line socket on the wall, remotely from the electronic system. In this way, bulk, heat, and potentially hazardous voltages are removed from a system user. Such power modules are referred to as power bricks.

The power module converts an input AC voltage to a safe, low voltage DC output. In one embodiment of the invention, the voltage produced is less than 42.5 volts—below the voltage and energy limit required by UL/CSA for user-accessible voltages. The preferred output voltage is 36 volts.

The power module is user switchable between a 110/220 volt AC input and can provide a power output of up to 150 watts in the exemplary embodiment of the invention. A single power module powers a complete data processing system including floppy disc mass storage and a video display. Power modules can be daisy-chained together to provide increased power to larger data processing systems as required.

The DC interconnect cable provides an interconnect from any power module to any system module in the data processing system. The cable consists of a thin, flexible cord with self-locking connectors at each end. The connectors provide ease of user installation and enhanced reliability. In installations including multiple power modules, the DC interconnect cables can be dressed together resulting in the appearance of a single cable assembly.

The modular DC interconnect provides a connection to each system module consisting of a shunting type connector which connects power into the system module and which also isolates power from all system modules connected to other power modules (larger systems only). DC power is routed to successive modules until a next DC interconnect is encountered. As the system grows to require a plurality of power modules, power produced by the power modules to provided to the system modules such that it is allocated efficiently, without one power module interfering with the operation of another. In this connection, each system module is coded with a power consumption value. Power modules are coupled to the system modules, and the system modules are configured, to judiciously allocate power to thereby minimize the number of power modules required while maintaining safe and efficient operation of the system modules.

Within each system module are individual DC-to-DC convertors that change the 36 volts provided by the power module to any of the voltages required to operate the system module. In the exemplary embodiment of the invention, the DC-to-DC convertors provide a 5-volt or 12-volt output. The DC-to-DC convertors are preferably produced to provide only enough power for the particular module. They are thus a low cost generic item.

In operation, each DC-to-DC convertor is highly efficient, approaching efficiencies of 70–80%. Because the DC-to-DC convertors are so efficient (and also because power generation occurs at the remotely located power module) only a small amount of heat is dissipated within each system module. Each DC-to-DC convertor is programmable, having its output voltage selected to be 5 volts or 12 volts in the present embodiment. Such voltage selection is dependent upon which system module the DC-to-DC convertor is connected to in the system. In this way, a single generic DC-to-DC convertor type can be used in all system applications, resulting in maximum cost/volume benefit. Accordingly, only a reduced inventory of DC-to-DC convertors need be maintained by a system manufacturer.

There are several advantages to the present power distribution invention when used with a modular computer system. Each system module has its own power supply so that each system module is responsible for generating its own power. Accordingly, the cost of producing power is distributed among each of the system modules and not burdened onto a base system. Thus, the advantages of modularity are more fully exploited. The power module is located remotely from the computer system and dissipates most of the heat produced during power generation. By putting the power module on the floor and away from the user's work space, bulk and heat are removed from the user's surroundings. Because there is only a small amount of heat generation, the user's work space system modules can be either convection cooled or use small and quiet fans for cooling. The DC-to-DC convertors are quite small and efficient, and lend themselves to custom integration. Power supply space requirements within each system module are reduced, aiding in reduction of the overall size of the system module. The modular computer system now becomes an unobtrusive, welcome feature to the user's work environment.

All voltages present at the user's work space are maintained below hazardous levels. Safety approvals by UL, CSA, EDE, etc. are now easier to obtain. Power can be plugged and unplugged without fear of personal injury. Such approach enables and encourages user addition of modules as the system grows and eliminates unnecessary service calls to reconfigure system equipment. When additional system modules are added, the power levels are the same as for previous system modules.

Line voltage switching for different countries is accomplished at the power module. The DC voltage output from the power modules is line voltage and frequency independent. Thus, the system is easily switched between different line voltages by a user.

The cost of power distribution is minimized by the format of the power module and DC-to-DC convertor. The power module provides a novel switching regulator that produces a partially regulated, single voltage output. The power capacity of the power module is chosen to be at the point at which the present technology provides the lowest possible cost per watt for a given power level. The system includes multiple generic DC-to-DC convertors, each of which is programmed to provide either 5 or 12 volts.

It is an important feature of this invention that the DC-to-DC convertors are automatically configured when placed in a particular system module. The DC-to-DC convertors are considered generic to the system, their programmed voltage output being a function of the system module into which they are connected.

The present invention provides significant flexibility in that specific voltage and power requirements are generated local to each system module. Adding additional power requirements does not require redesign of the power system, but merely the addition of DC-to-DC convertors. For example, adding a different monitor having different voltage needs requires the addition of a DC-to-DC convertor for the monitor. In prior art systems, a new power supply would be required.

DETAILED DESCRIPTION OF A PREFERRED EMBODIMENT

The present invention provides a modular power supply including a power module portion 10 (FIG. 1) and a DC-to-DC convertor portion 11. The invention is intended for use in a modular electronic device, such as the modular computer system shown in FIG. 1, which includes a processor module 12, a dual floppy memory module 13, and a monitor 15.

Figure 1:
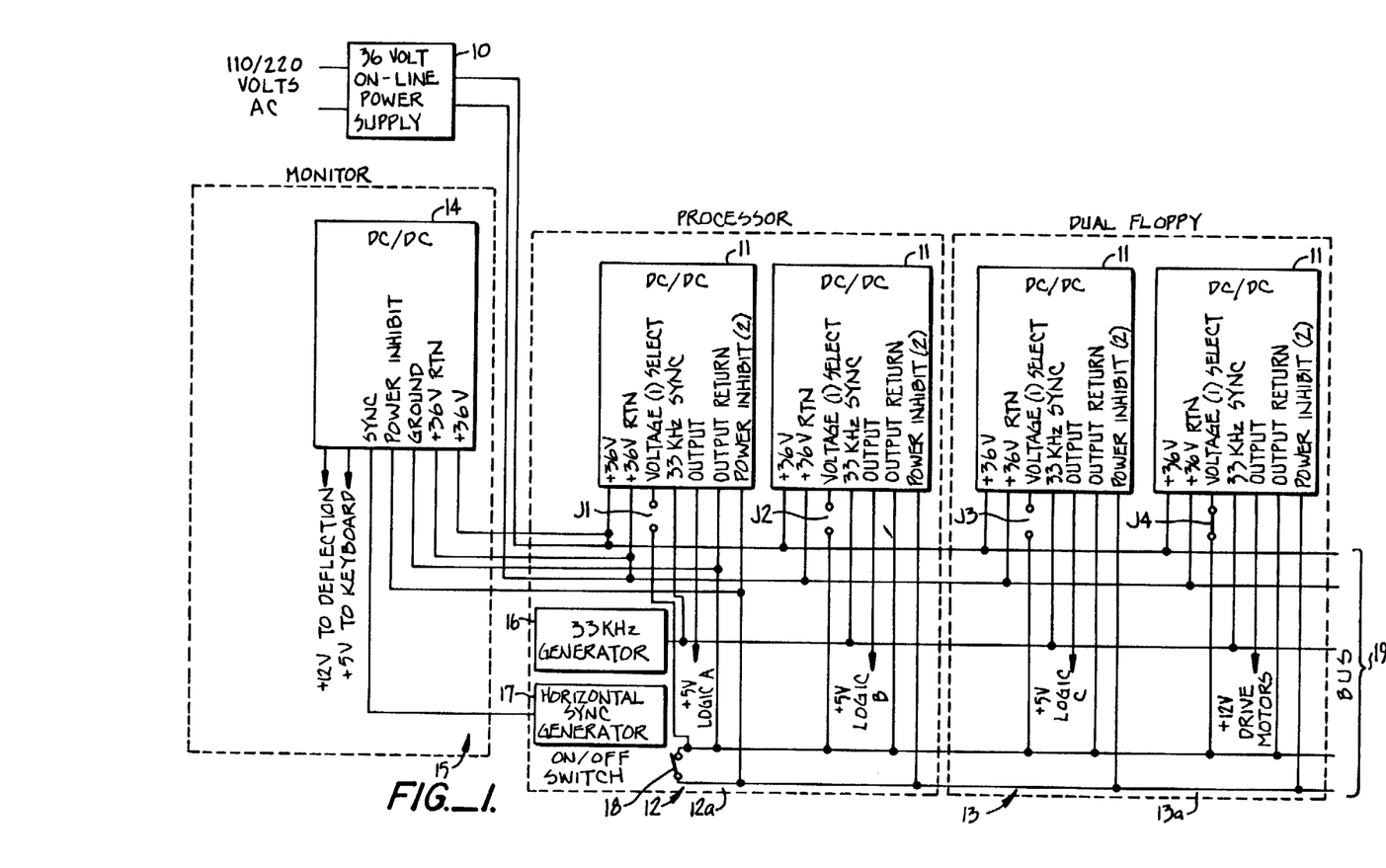
FIG. 1 is a block diagram of the modular programmable DC power supply invention incorporated within a data processing system.

A user selected 110/220 volts AC line source is coupled to power module 10, which is a 36 volt on-line power supply in this embodiment of the invention. The output from power module 10 is routed along a bus 19 through system processor module 12 and system dual floppy memory module 13.

A series of DC-to-DC convertors is coupled to bus 19 and produce appropriate operating voltages and power levels for the system module with which the DC-to-DC convertor is associated. For example, two DC-to-DC convertors are shown as part of processor module 12. The DC-to-DC convertors are shown providing a 5-volt output to lines Logic A and Logic B. Referring to dual floppy memory module 13, the DC-to-DC convertors provide a 5-volt output to line Logic C and a 12-volt output to the drive motors.

One aspect of the present invention provides a generic DC-to-DC convertor operating from a fixed voltage supplied by the power module and by which a system module is powered according to its voltage and current requirements. For purposes of illustration and example of a preferred embodiment of the invention, the discussion herein is limited to providing 5-volt and 12-volt DC-to-DC convertor outputs. Other embodiments of the invention can provide any number of voltages at any number of voltage values. Although two DC-to-DC convertors are shown associated with each system module, some system modules require only one DC-to-DC convertor whereas system modules require three or more DC-to-DC convertors.

Referring to monitor 15 in FIG. 1, a DC-to-DC convertor 14 is shown that produces both 5-volt and 12-volt outputs. Such arrangement allows the use of various monitors in the computer system without having either to reconfigure the power supply, or to provide an additional or otherwise modified power supply.

Each DC-to-DC convertor is provided with a power inhibit line routed along bus 19 to a master switch 18 by which operation of the DC-to-DC convertors is controlled. Only one switch is required to control any number of DC-to-DC convertors and thereby remove power from the system. Other embodiments of the invention provide individual addressing of each DC-to-DC convertor to produce a software controlled inventory of power supply status and system equipment. Another aspect of the power inhibit feature is that it provides a system continuity sense. Removal of a system module or of a system module DC-to-DC convertor during a power-on condition produces a power inhibit signal which is routed along the power bus through the system to shut the system down.

A 33-kHz generator 16 is shown coupled the power bus 19 to route a generator signal the various system DC-to-DC convertors. Generator 16 produces a synchronizing signal to operate all of the DC-to-DC convertors in unison to avoid beat frequencies and other such interference. As a result, the system operates more efficiently while the DC-to-DC convertors do not produce annoying buzzing noises that might also interfere with operation of the equipment and/or annoy a system user. A horizontal sync generator 17 is shown coupled to DC-to-DC convertor 14 which operates monitor 15. The monitor's DC-to-DC convertor is operated at the convenient horizontal sync generator frequency to avoid unnecessary and redundant generating circuitry. Interference is not produced by such arrangement because the monitor is remotely located from the system modules.

One important aspect of the present invention which is discussed more fully below is that of programmed DC-to-DC convertor output voltage levels. Each system module includes a motherboard—designated 12A for processor module 12 and designated 13A for dual floppy memory module 13. An exemplary embodiment of the invention provides for variously setting a jumper J1-J4 between traces on the mother board such that a voltage select line is set to provide any of the available programmed output voltage levels. Accordingly, each DC-to-DC convertor is a generic unit that, when plugged into a mother board, produces a correct output voltage level for the corresponding system module, as selected by the presence or absence of a jumper between mother board printed circuit traces.

The present invention provides a DC-to-DC convertor default mode by which the DC-to-DC convertor always provides its lowest programmed output voltage level in the absence of voltage level selection. Such default prevents the possibility of supplying a higher than required voltage that could damage the system module circuitry.

Figure 2:
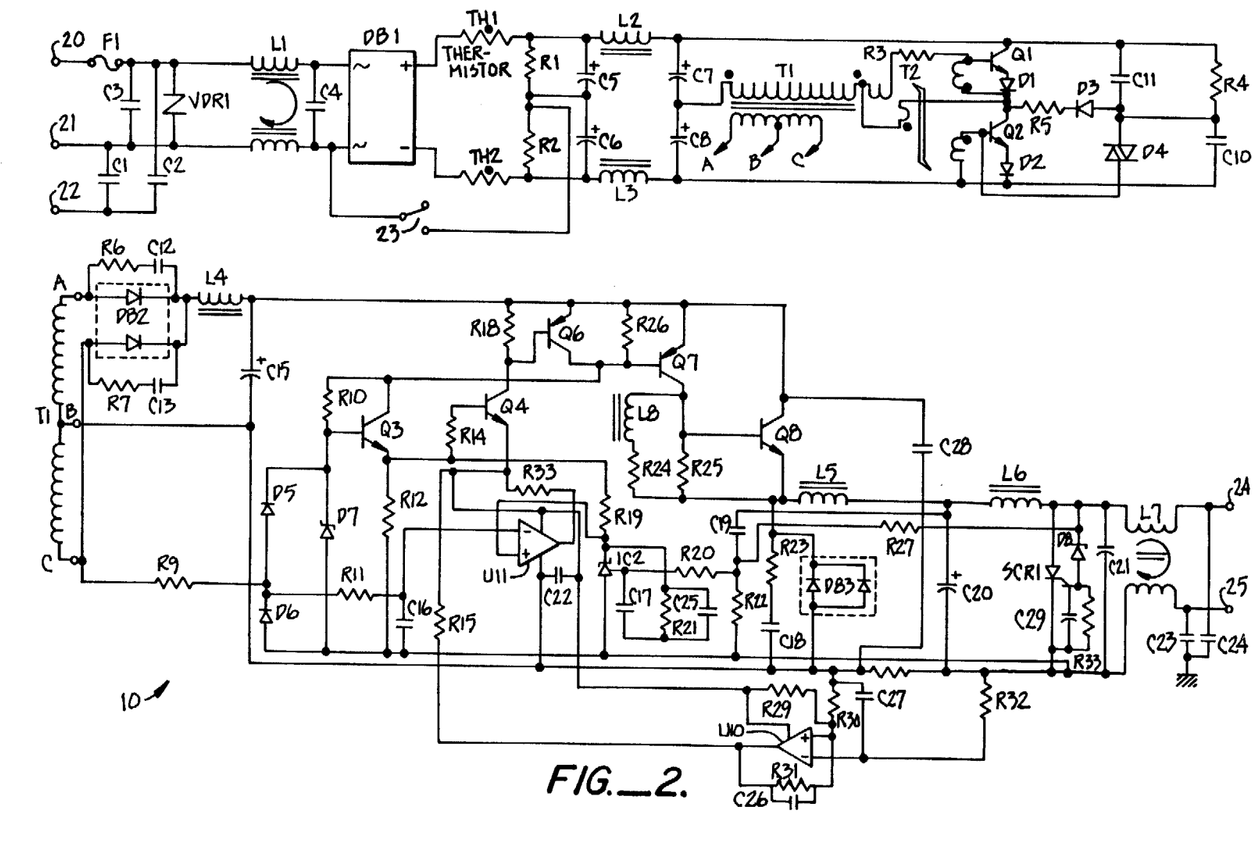
FIG. 2 is a schematic diagram of a 36-volt power module.

A schematic diagram of a preferred power module is shown in FIG. 2. A 110/220 volt AC power source is coupled to the power module at terminals 20/21. A ground connection is provided at a terminal 22. The power source is coupled through a fuse F1 to a common mode filter choke arrangement consisting of an inductor L1, a rectifier VDR1, and capacitors C1–C4. The filter choke is provided to prevent electromagnetic interference (EMI). User connection to 110 or 220 volts AC is selected at a switch 23.

The filtered AC source is rectified by a diode bridge rectifier circuit DB1, which provides a half-wave pulsating DC output to thermistors TH1/TH2. The thermistors are provided to limit in-rush current during initial system power turn-on and provide power supply surge protection. Pulsating direct current output from the diode bridge is filtered by a capacitor/choke filter circuit comprising resistors R1/R2, capacitors C5/C6, and inductors L2/L3.

Filtered direct current from the filter circuit is coupled across a divider capacitor circuit consisting of capacitor C7/C8. The power module provides DC-to-DC conversion at this point to convert the approximately 350 volts DC supplied across the divider capacitors to low voltage DC for distribution to the DC-to-DC convertor. To accomplish DC-to-DC conversion, an unregulated self-oscillator is provided consisting of transistors Q1/Q2, diodes D1–D4, resistors R3/R4, capacitors C10/C11, and transformers T1/T2. Each of transistors Q1 and Q2 provides a separate oscillator circuit for following a different half-wave of the pulsating DC input voltage. That is, the pulsating DC alternately operates one oscillator and then the other. Such oscillation provides an oscillating current flow in the primary of transformer T1 which induces a flux in the transformer's secondary. A rectifier circuit consisting of full-wave rectifier DB2, resistors R6/R7, and capacitors C12/C13 rectifies a current flow induced in the secondary of transformer T1. The rectifier also inverts every other half-cycle of the signal produced to provide a continuous square wave pulsating DC current flow to a filter circuit comprising inductor L4 and capacitor C15. Filtered DC is produced at approximately 15 volts DC in the exemplary embodiment of the invention.

The output voltage provided by the circuit shown in FIG. 2 is controlled by transistor Q8 as a function of a transistor base control signal. The output voltage is coupled through a filter circuit consisting of inductors L5/L6 and capacitor C20. An over-voltage crowbar protection circuit is provided by silicon controlled rectifier SCR1, diode D8, and the circuit consisting of capacitor C29 and resistor R33.

A filter circuit for eliminating EMI is provided at the output of the power module by capacitors C21, and C23/C24, and inductor L7. A 36-volt filtered regulated DC output is provided at terminals 24 and 25 for distribution to the DC-to-DC convertors.

Power module current voltage output regulation is provided as follows: Current regulation is provided by a current limiting circuit consisting of integrated circuit U10, resistors R29–R30, and capacitors C26/C27. Integrated circuit U10 provides a compare function and produces an appropriate output signal which is coupled through resistor R15 to the emitter of transistor Q4. In this way, current flow through transistor Q4 is controlled in accordance with desired circuit parameters.

Transistor Q4 is part of a switch network which also comprises transistors Q6 and Q7, and which operate to control transistor Q8, the main power supply switching transistor. A speed-up circuit, consisting of resistors R24/R25 and inductor L8 is included at the collector of transistor Q7 to provide more rapid operation of transistor Q8, and thus improve power supply response time and, accordingly, power supply regulation.

Voltage regulation is accomplished by sensing an output voltage coupled through resistor R27 to resistor divider circuit R20/R22. In the exemplary embodiment of the invention, a constant reference voltage level of 2.75-volts DC is maintained at a node formed by resistors R20/R22. As the voltage output produced by the power module varies, deviation from the constant reference voltage is detected at reference/comparator integrated circuit IC2. An error output signal thereby produced is coupled through resistors R19/R14 to the base of transistor switch Q4. In this way, conduction of transistor Q4 is adjusted to maintain the switching action of transistor Q8 such that a constant output voltage is provided. Capacitors C17, C19, and C25 are provided for loop compensation. Diode rectifier DB3 is provided as a return or catch device in the output loop to bleed the circuit inductors when transistor switch Q8 is not conducting.

A power module synchronizing circuit consisting of diodes D5/D7, resistors R10/R11, and transistor Q3 is provided to coordinate DC-to-DC conversion by the power module with the AC-to-DC switching frequency. In this way, extremely precise and accurate control of the power module output voltage is maintained.

Figure 3:
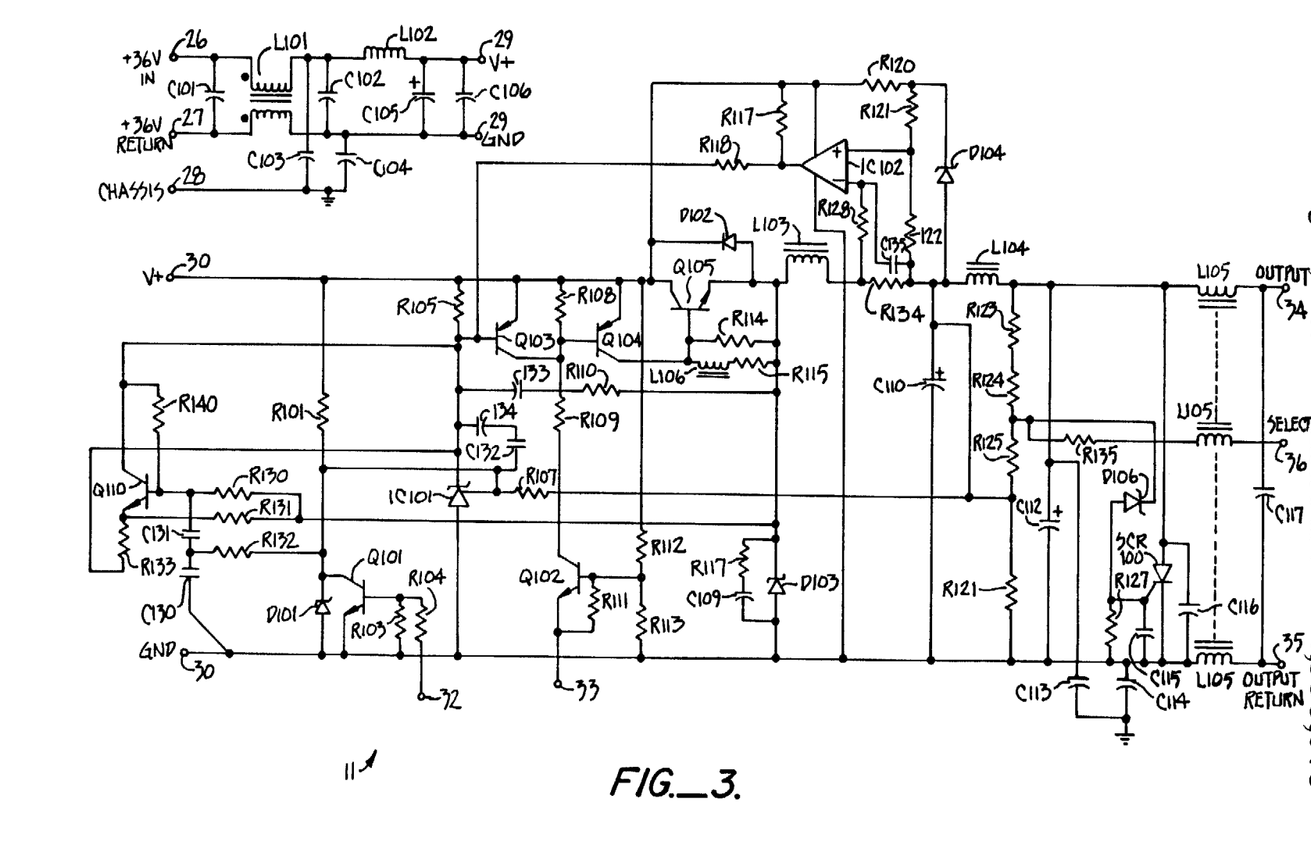
FIG. 3 is a schematic diagram of a DC-to-DC convertor.

A schematic diagram of a preferred DC-to-DC convertor circuit is shown in FIG. 3. A 36-volt DC source is coupled from power module 10 through terminals 26/27 to an input filter circuit consisting of inductors L101/L102 and capacitors C101-C106. Such circuit is similar to the common mode filter choke of the power module and is provided to prevent EMI. A chassis ground terminal 28 is also provided.

The filtered DC voltage output from the choke circuit is coupled from point 29 to point 30. DC-to-DC conversion of the filtered DC input voltage is provided by a ramp generator circuit consisting of transistor Q110, resistors R130-R133, and capacitor C131. Voltage output level is a function of ramp generator switching frequency. The collector of transistor Q110 is coupled to transistor Q103 which in turn controls transistor Q104. The circuit is configured such that ramp positive DC voltage level controls the amount of transistor Q103 switch-off time. The sooner transistor Q103 is switched off (higher ramp frequency), the lower the output voltage and vice versa.

Operation of the DC-to-DC convertor is similar to that of the power module in that a power switching transistor Q105 controls voltage flow to output terminal 34. A buck regulator circuit including integrated circuit IC101 and capacitors C132/C134 provides voltage regulation by producing a control signal which is coupled to the base of transistor Q103. A reference signal is provided to integrated circuit IC101 coupled via resistor R107 from a voltage divider circuit comprising resistors R124, R125, R135, and R121. Control of transistor Q105 is maintained in response to conduction of transistor Q103. The voltage divider circuit also has the utility of providing programmed output voltage levels (discussed below).

A current limiting circuit is provided by integrated circuit IC102 which senses current across resistor R134. An associated current limiting signal is produced in accordance therewith that is coupled through resistor R118 to the base of transistor Q103. Transistor Q103 is operated to conduct in accordance with sensed current levels, thereby controlled transistor Q105.

The DC-to-DC convertor also provides an operation inhibit line that couples an operation inhibit signal from terminal 33 through resistor R111 to the base of transistor Q102. Operation of transistor Q102 drops the voltage across resistors R108/R109 and allows transistor Q104 to operate. In the inhibit mode, transistor Q102 is off, which accordingly turns transistor Q104 off and inhibits operation of power switch transistor Q105. Thus, operation of the DC-to-DC convertor and power output to system modules is inhibited.

A sync signal is coupled via terminal 32 to a synchronization control circuit comprising transistor Q101. The sync control circuit adjusts the ramp starting point of the ramp generator circuit to maintain ramp generator operation in accordance with an external sync signal, such as that provided by 30-kHz generator 16 (FIG. 1). By routing the same sync signal to all of the DC-to-DC convertors, synchronized operation of the convertors is maintained, the possibility of interference caused by off frequency operation is eliminated, and precision circuit operation is assured.

An important feature of the present invention is the programmed output voltage levels provided by the DC-to-DC convertor. By providing a generic DC-to-DC convertor module, economies of scale are realized and inventory costs are reduced such that the present invention can be produced economically and efficiently. When a DC-to-DC convertor is plugged into a mother board, the mother board sets the DC-to-DC convertor to produce a correct output voltage level.

In the exemplary embodiment of the invention, a printed circuit trace is provided to couple select pin 36 to ground by means of jumpers (J1-J4 in FIG. 1). In such instance, the voltage divider comprised of resistors R121/R125 is set to another value by the inclusion of parallel resistor R135. The exemplary embodiment of the invention sets the select circuit such that, in the absence of selection (no jumper), the voltage divider circuit provides a lower output voltage. Thus, there is a default to the lowest programmed voltage to prevent accidental application of high voltages to low voltage circuits.

By jumping the select line to ground, the value of the voltage divider circuit is changed and a higher output voltage is selected. The value of the divider and parallel resistors program the output voltage produced by the DC-to-DC convertor. Resistor values are selected to provide desired output levels. Additional parallel resistors can be provided to produce additional programmed output voltage levels.

Operation of the programmed output voltage select circuit affects two components of the DC-to-DC convertor circuit. The first component is that of voltage sense and reference level. The node formed at the divider circuit consisting of resistors R121/R125 is coupled through resistor R107 to integrated circuit IC101 to provide voltage regulation at a constant output voltage. When an output voltage selection occurs, the voltage sense circuit is changed to provide a different reference voltage to integrated circuit IC101. In response thereto transistor Q105 conducts over a longer interval to provide a larger output voltage.

The second component of the DC-to-DC convertor circuit that is changed by voltage selection is the crowbar protection circuit which consists of silicon controlled rectifier SCR100 and zener diode D106. As a function of the value of the voltage divider circuit as determined by voltage selection and also as a function of a sense current circuits induced in inductor L105, capacitor C115 is charged to a point where the silicon control rectifier is fired.

Figure 4:
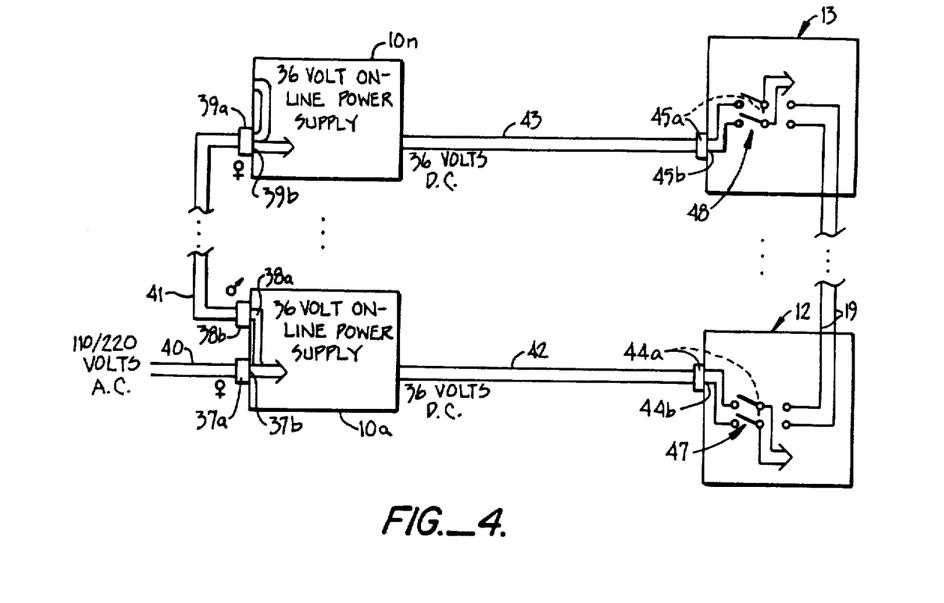
FIG. 4 is a block diagram showing daisy-chaining or power modules and DC-to-DC convertors.

The present invention is intended to be infinitely expandable. Accordingly, any number of power modules and DC-to-DC convertors can be provided by the present invention as needs of the corresponding system require. FIG. 4 is a block diagram showing a plurality of power modules 10a-10n coupled via respective power interconnect cables 42/43 to a plurality of system modules 12/13. An AC power source at 110/220 volts AC is coupled through an AC power cord 40 through a male connector 37A and a female connector 37B to first power module 10a. The power module includes a female receptacle 38a which routes the AC power source to an interconnecting cable 41 via a male connector 38b. Interconnecting cable 41 includes a female connector 39a by which power is routed to power module 10n at connector 39b. The power modules can be daisy-chained as required for various system configurations and applications.

The power modules are interconnected to the system modules via mating connectors, such as connectors 44a/44b (module 12) and connectors 45a/45b (module 13). Each system module is configured such that it receives power either at its input connector from a power module or via power bus 19. Switches 47 and 48 are provided in modules 12 and 13, respectively, and are physically coupled to connectors 44b and 45b, respectively, to sense the presence of a mating connector at the system module. When a mating connector is coupled to the system module, the switch is operated to connect voltage from the power module directly into the system module and, accordingly, along the power bus extending therefrom. When the power connector is uncoupled from the system module, switch 47/48 is operated to connect the system module to the power bus. In the exemplary embodiment of the invention shown in FIG. 4, removal of connector 44a from mating connector 44b toggles switch 47 which then connects system module 12 to power bus 19. In this way, each system module senses the presence of a power module and the power is therefore appropriately allocated within the system.

To assure that each power module is properly loaded by the system, and that power is efficiently allocated to the system modules, a rating scheme is provided by which each system module is rated on an objective scale as to its power requirements. The system modules are interconnected one with the other, thereby extending the power bus between them. When a predetermined threshold system loading value is obtained—which value is the sum of the rating values of each system module—an additional power module is added to power any additional system modules included in the system. Accordingly, optimum power distribution is obtained.

Another embodiment of the invention provides a software controlled routine to integrate the system modules as configured and indicate where power modules should be placed. The routine forms a display on a system monitor to indicate the correct system module to which an additional power module should be connected. Fail-safe power allocation is provided by the routine which is readily produced for the various embodiments of the invention.

Still another embodiment of the present invention provides a series of addressable DC-to-DC convertors by which power supplied to a particular module is inhibited once the driving power module's load rating is exceeded. In this way, a power module is not overloaded.

The foregoing was given for illustration and example of a preferred embodiment of the invention. The present invention could be made in other equivalent embodiments. For example, different DC-to-DC convertor voltage levels can be provided. Additionally, further select lines can be added to the DC-to-DC convertor circuit to provide a plurality of voltage divider values by which a plurality of programmed output voltages can be selected. Such selection can be made under software control, or by a series of mother board dual in-line pin switches or printed circuit traces. Therefore, the scope of the invention should be limited only by the breadth of the following claims.

We claim:

1. A modular programmable DC power supply for providing a designated DC output voltage to a computer system comprising:

a power module for producing a first fixed regulated DC voltage output;

a power bus coupled to said first DC voltage output; and at least one DC-to-DC converter module coupled to said power bus to receive said first DC voltage from said power module and operable to convert said first DC voltage to a second regulated DC voltage at an output terminal, said DC-to-DC converter module including an input terminal, programmable reference means, coupled to said input terminal and responsive to an input on said input terminal, for producing one of a plurality of reference voltage values, and voltage regulation means, coupled to said reference means and responsive to said reference voltage value, for selecting one of a plurality of values for said second DC voltage, such that said DC power supply is generic in that the value of the second voltage at the output terminal for a computer system using said DC power supply is determined by the signal provided to said input terminal by the computer system.

2. The power supply of claim 1 further comprising a system module printed circuit board secured to said DC-to-DC converter and including:

a power supply line coupled to said output terminal;

a voltage select line coupled to said input terminal; and means, coupled to said voltage select line, for providing a signal to select a desired value of said second DC voltage.

3. The power supply of claim 1 wherein a first value of said second DC voltage is produced in the absence of a signal on said input terminal and a second, higher value of said second DC voltage is produced responsive to a signal on said input terminal.

4. The power supply of claim 3 wherein said means for providing a signal comprises a line coupled to ground for selecting said second value and an open line for selecting said first value.

5. The power supply of claim 4 wherein said first value is approximately five volts and said second value is approximately twelve volts.

6. The power supply of claim 1 wherein said programmable reference means comprises a voltage divider circuit.

7. The power supply of claim 1 wherein said voltage regulation means comprises:

regulator means, coupled to said programmable reference means and responsive to said reference voltage value, for producing a control voltage;

ramp generator means, coupled to said regulator means and responsive to said control signal, for producing a ramped, switching signal; and power amplifier means, coupled to said ramp generator means and responsive to said ramped, switching signal, for generating said second DC voltage.

8. The power supply of claim 7 further comprising:

at least a second said DC-to-DC converter module coupled to said power bus; and means for synchronizing the switching frequencies of said ramp generator means of said DC-to-DC converter modules.

9. The power supply of claim 1 further comprising over-voltage protection means, coupled to said output terminal and to said programmable reference means, for limiting the value of said second DC voltage to a value substantially proportionate to said reference voltage value.

10. The power supply of claim 1 further comprising inhibit means, coupled to said voltage regulation means, for inhibiting the generation of said second DC voltage.

11. A modular programmable DC power supply for providing a designated DC output voltage to a computer system, comprising:
- at least a first and second power module, each power module producing a first regulated DC voltage output;
- at least a first and second power bus, each power bus coupled to said first DC voltage output of said first and second power modules, respectively;
- at least one DC-to-DC converter module coupled to each of said power buses to receive said first DC voltage from said power module and operable to convert said first DC voltage to a second regulated DC voltage at an output terminal, said DC-to-DC converter including
  - an input terminal,
  - programmable reference means, coupled to said input terminal and responsive to an input on said input terminal, for producing one of a plurality of reference voltage values, and
  - voltage regulation means, coupled to said reference means and responsive to said reference voltage value, for selecting one of a plurality of values for said second DC voltage,
- such that said DC power supply is generic in that the value of the second voltage at the output terminal for a computer system using said DC power supply is determined by the signal provided to said input terminal by the computer system.

12. The power supply of claim 11 further comprising a plurality of computer system modules, each requiring one of said plurality of values of said second DC voltage at a load current value and including:
- a power input coupled to said output terminal of one of said DC-to-DC converters for receiving said second DC voltage;
- selecting means, coupled to said input terminal of one of said DC-to-DC converters, for generating a signal to said input terminal operative to select said required value of said second DC voltage; and
- means for limiting the number of system modules coupled to each DC-to-DC converter so that the aggregate load current value supplied by such DC-to-DC converter does not exceed a specified value.

13. The power supply of claim 12 wherein said limiting means comprises:
- a power bus coupling said power inputs of said system modules; and
- switching means, coupled to said power inputs and responsive to the coupling of an output terminal of a DC-to-DC converter to said power input, for terminating said power bus in one direction;
- such that said second DC voltage from each said DC-to-DC converter is provided through said power bus to each system module along said power bus up to the module immediately preceding the next system module coupled to a DC-to-DC converter.

14. A modular programmable DC power supply for providing a designated DC output voltage to a computer system, comprising:
- a power module for producing a first regulated DC voltage output;
- a power bus coupled to said first DC voltage output;
- at least one DC-to-DC converter module coupled to said power bus to receive said first DC voltage from said power module and operable to convert said first DC voltage to a second regulated DC voltage at an output terminal, said DC-to-DC converter including
  - an input terminal,
  - programmable reference means, coupled to said input terminal and responsive to an input on said input terminal, for producing one of a plurality of reference voltage values, and
  - voltage regulation means, coupled to said reference means and responsive to said reference voltage value, for controlling the value of said second DC voltage; and
- a computer system module printed circuit board secured to said DC-to-DC converter and including
  - a power supply line coupled to said output terminal,
  - a voltage select line coupled to said input terminal, and
  - means, coupled to said voltage select line, for providing a signal to select a desired value of said second DC voltage;
- such that said DC power supply is generic in that the value of the second voltage at the output terminal for a computer system using said DC power supply is determined by the signal provided to said input terminal by said computer system module.

15. A modular programmable DC power supply for providing a designated DC output voltage to a system, comprising:
- a power module for producing a first regulated DC voltage output;
- a power bus coupled to said first DC voltage output;
- at least one DC-to-DC converter module coupled to said power bus to receive said first DC voltage from said power module and operable to convert said first DC voltage to a second regulated DC voltage at an output terminal, said DC-to-DC converter including
  - an input terminal,
  - programmable reference means, coupled to said input terminal and responsive to an input on said input terminal, for producing one of a plurality of reference voltage values,
  - regulator means, coupled to said programmable reference means and responsive to said reference voltage value, for producing a control voltage,
  - ramp generator means coupled to said regulator circuit and responsive to said control signal, for producing a ramped, switching signal, and
  - power amplifier means, coupled to said ramp generator means and responsive to said ramped, switching signal, for generating said second DC voltage;
- over-voltage protection means, coupled to said output terminal and to said programmable reference means, for limiting the value of said second DC voltage to a value substantially proportionate to said reference voltage value; and means, coupled to said voltage regulation means, for inhibiting the generation of said second DC voltage;

such that said DC power supply is generic in that the value of the second voltage at the output terminal for a computer system using said DC power supply is determined by the signal provided to said input terminal by the computer system.

16. A modular programmable DC power supply for providing a designated DC output voltage to a computer system, comprising:

(a) at least a first and second power module, each power module producing a first regulated DC voltage output;

(b) at least a first and second power bus, each power bus coupled to said first DC voltage output of said first and second power modules, respectively;

(c) at least one DC-to-DC converter module coupled to each of said power buses to receive said first DC voltage from said power module and operable to convert said first DC voltage to a second regulated DC voltage at an output terminal, each said DC-to-DC converter including
an input terminal,
programmable reference means, coupled to said input terminal and responsive to an input on said input terminal, for producing one of a plurality of reference voltage values, and
voltage regulation means, coupled to said reference means and responsive to said reference voltage value, for selecting one of a plurality of values for said second DC voltage;

(d) a plurality of computer system modules, each requiring one of said plurality of values of said second DC voltage at a load current value and including
a power input coupled to said output terminal of one of said DC-to-DC converters for receiving said second DC voltage, and
selecting means, coupled to said input terminal of one of said DC-to-DC converters, for generating a signal to said input terminal operative to select said required value of said second DC voltage;

(e) a power bus coupling said power inputs of said system modules; and (f) switching means, coupled to said power inputs and responsive to the coupling of an output terminal of a DC-to-DC converter to said power input, for terminating said power bus in one direction;

such that said second DC voltage from each said DC-to-DC converter is provided through said power bus to each system module along said power bus up to the module immediately preceding the next system module coupled to a DC-to-DC converter.

* * * * *